United States Patent
Yang et al.

(10) Patent No.: US 12,082,679 B1
(45) Date of Patent: Sep. 10, 2024

(54) SPLIT APPLICATOR

(71) Applicant: SHYA HSIN PACKAGING INDUSTRY (CHINA) CO., LTD., Kunshan (CN)

(72) Inventors: Haiying Yang, Kunshan (CN); Haixiang Wang, Kunshan (CN); Christophe Jacob, Kunshan (CN)

(73) Assignee: SHYA HSIN PACKAGING INDUSTRY (CHINA) CO., LTD., Kunshan (CN)

( * ) Notice: Subject to any disclaimer, the term of this patent is extended or adjusted under 35 U.S.C. 154(b) by 0 days.

(21) Appl. No.: 18/222,494

(22) Filed: Jul. 17, 2023

(30) Foreign Application Priority Data

Apr. 10, 2023 (CN) .......................... 202310373502.8

(51) Int. Cl.
*A45D 34/04* (2006.01)
*A45D 40/26* (2006.01)
*A46B 7/04* (2006.01)
*A46B 9/02* (2006.01)

(52) U.S. Cl.
CPC ............ *A45D 34/045* (2013.01); *A46B 9/021* (2013.01); *A45D 40/265* (2013.01); *A46B 7/042* (2013.01); *A46B 7/044* (2013.01); *A46B 2200/1046* (2013.01)

(58) Field of Classification Search
CPC .. A45D 34/045; A45D 34/042; A45D 34/046; A45D 40/262; A45D 40/265; A45D 40/267; A46B 9/021; A46B 2200/1046; A46B 7/04; A46B 7/042; A46B 7/044
USPC .................................. 401/126–130; 132/317
See application file for complete search history.

(56) References Cited

U.S. PATENT DOCUMENTS

| | | | |
|---|---|---|---|
| 7,231,926 B2 * | 6/2007 | Kim ........................ | A46B 3/18 132/218 |
| 10,888,145 B2 * | 1/2021 | Kukreja ............... | A45D 40/265 |
| 2011/0297174 A1 * | 12/2011 | Ornoski ............... | A46B 5/0054 401/122 |
| 2017/0347776 A1 * | 12/2017 | Jacob ...................... | A46B 3/18 |

* cited by examiner

*Primary Examiner* — David J Walczak
(74) *Attorney, Agent, or Firm* — Bayramoglu Law Offices LLC

(57) ABSTRACT

A split applicator includes an application assembly and an insert. The application assembly includes a connecting rod and an application head that are connected fixedly. A mounting groove and an accommodating cavity communicating with each other are formed in the application head, a connecting member is fixed on the insert, the insert is provided in the accommodating cavity, and the connecting member is inserted into the mounting groove to assemble the insert and the application assembly together. The split applicator includes the application assembly and the insert. In response to makeup application, the insert provides a certain support force for the application head, such that the application head is not bent easily to achieve a desirable makeup effect. The application assembly and the insert are assembled firmly together through the mounting groove and the connecting member, and are not separated easily.

15 Claims, 22 Drawing Sheets

SPLIT APPLICATOR

CROSS REFERENCE TO THE RELATED APPLICATIONS

This application is based upon and claims priority to Chinese Patent Application No. 202310373502.8, filed on Apr. 10, 2023, the entire contents of which are incorporated herein by reference.

TECHNICAL FIELD

The present disclosure relates to makeup tools, and in particular to a split applicator.

BACKGROUND

With the improvement of living standards, makeup is indispensable to people's life, and applicators become frequently-used makeup tools. For example, a lip applicator is used to apply a lip balm or a lip gloss. However, most of the existing applicators are integrated structures, and thus when being used forcibly for makeup applications, the applicators are easily bent, which affect the makeup effect.

SUMMARY

The present disclosure provides a split applicator to overcome the above-mentioned defect. The split applicator includes the application assembly and the insert. In response to makeup application, the insert provides a certain support force for the application head, such that the application head is not bent easily to achieve a desirable makeup effect. The application assembly and the insert are assembled firmly together through the mounting groove and the connecting member, and are not separated easily.

To solve the technical problem, the present disclosure employs the following technical solutions.

A split applicator includes an application assembly and an insert, where the application assembly includes a connecting rod and an application head that are connected fixedly, a mounting groove and an accommodating cavity communicating with each other are formed in the application head, a connecting member is fixed on the insert, the insert is provided in the accommodating cavity, and the connecting member is inserted into the mounting groove to assemble the insert and the application assembly together.

Optionally, the application head includes a first surface and a second surface that are arranged opposite to each other, the accommodating cavity is formed in the second surface, and the mounting groove includes a first mounting groove and/or a second mounting groove;

in a case where the mounting groove includes the first mounting groove, the first mounting groove is formed in the connecting rod, a first end of the insert is provided with a first connecting member, and the first connecting member is inserted into the first mounting groove; and in a case where the mounting groove includes the second mounting groove, the second mounting groove is formed in the application head, a second end of the insert is provided with a second connecting member, and the second connecting member is inserted into the second mounting groove.

Optionally, the second mounting groove is a through groove.

Optionally, a first end of the application head is connected to the connecting rod, and a second end of the application head is a free end; two ends of the accommodating cavity are respectively communicated with the first mounting groove and the second mounting groove; the second mounting groove penetrates through the second end of the application head; and the application head is clamped with a lower surface of the insert through a convex edge assembly.

Optionally, the first mounting groove is arranged along an axial direction of the connecting rod; the first mounting groove has a length of L1, and the connecting rod has a length of L2, where $L1 \leq 0.5*L2$; the first mounting groove has a diameter of R1, and the connecting rod has a diameter of R2, where $R1 \leq 0.5*R2$; the first mounting groove is a top-opened mounting groove; and a gap is formed between the first mounting groove and the first connecting member.

Optionally, the first connecting member and the connecting rod are fixed through a clamping structure.

Optionally, the clamping structure includes a clamping point portion and a convex rib; the clamping point portion is provided in the first mounting groove, and the convex rib is provided on the first connecting member; or the convex rib is provided in the first mounting groove, and the clamping point portion is provided on the first connecting member; and the convex rib and the clamping point portion are clamped with each other.

Optionally, the clamping structure includes a clamping point portion and a clamping groove, and the clamping point portion is clamped into the clamping groove; the clamping point portion is provided in the first mounting groove, and the clamping groove is formed in the first connecting member; or, the clamping groove is formed in the first mounting groove, and the clamping point portion is provided on the first connecting member.

Optionally, the application assembly is made of a plastic material, a storage groove is formed in the first surface, and an application unit is provided on each of the first surface and the second surface.

Optionally, the insert is made of a metal, ceramic or glass material, and an outer surface of the insert is a convex surface or a concave surface.

Optionally, the insert is made of a plastic material, and an outer surface of the insert is provided with the application unit.

The present disclosure has the following beneficial effects:

1) The applicator includes the application assembly and the insert that are independent from each other. In response to mounting, the insert is provided in the accommodating cavity of the application head, and the connecting member on the insert is inserted into the mounting groove of the application assembly. Moreover, the insert and the application assembly are fixed through the clamping point portion. Thus, the application assembly and the insert are connected firmly and mounted conveniently.

2) A hardness of the insert can be greater than a hardness of the application assembly. When the application head is used for the makeup application, the insert supports the application head, such that the application head is not bent to achieve a desirable makeup effect. Application units of different materials, sizes, and densities may be respectively provided on the insert and the application head. This satisfies different makeup requirements of users, and expands the use function of the applicator.

3) Since the insert is made of the metal, ceramic or glass material, the applicator comes with a higher sense of luxury, and can provide multiple senses of touch for the users.

Because of the smooth outer surface of the insert, a logo, a text, a pattern and so on can be provided on the smooth surface. In this way, the logo and the pattern are not covered for the glue flocking and are clear.

Figure 1:
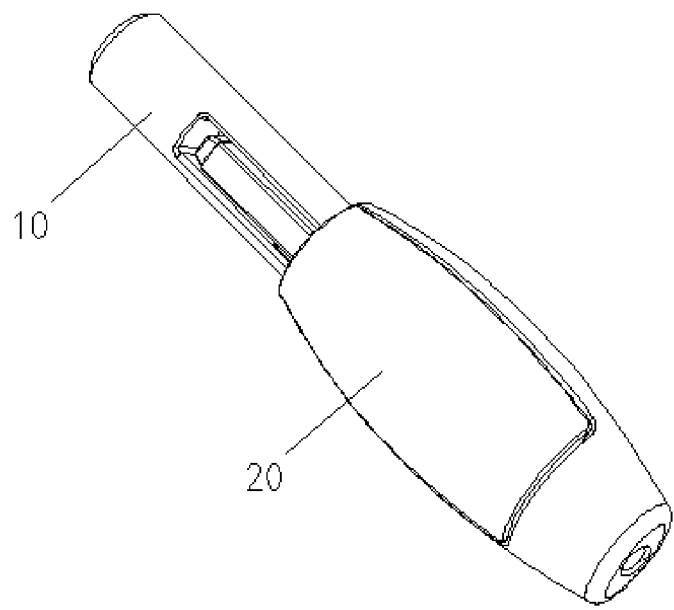
FIG. 1 is a first schematic structural view of an applicator according to Embodiment 1 of the present disclosure.
Figure 2:
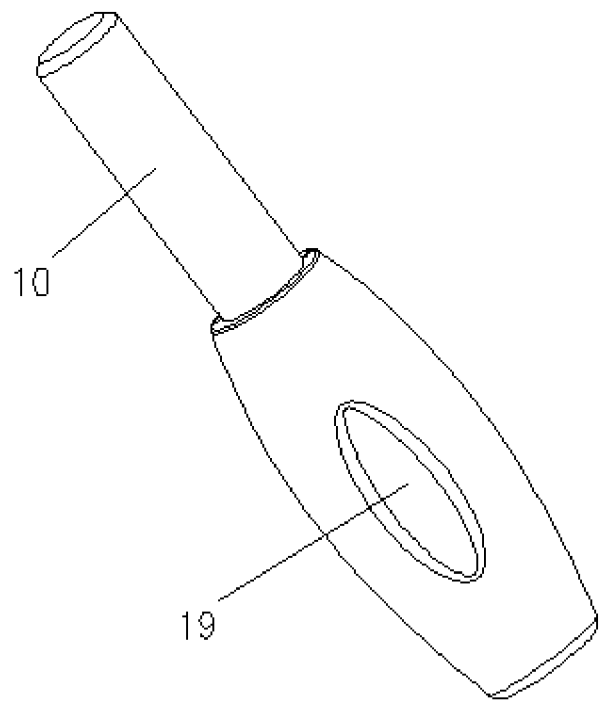
FIG. 2 is a second schematic structural view of an applicator according to Embodiment 1 of the present disclosure.
Figure 3:
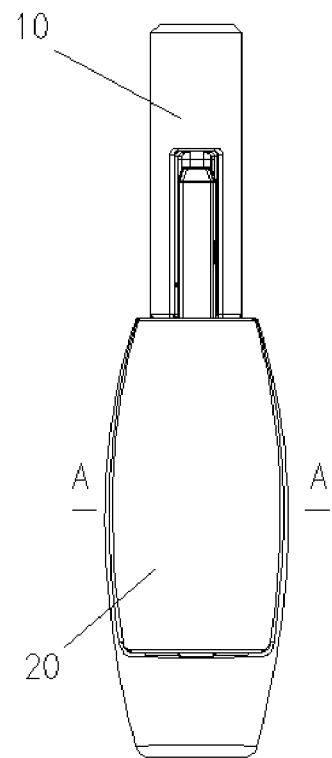
FIG. 3 is a front view of an applicator according to Embodiment 1 of the present disclosure.
Figure 4:
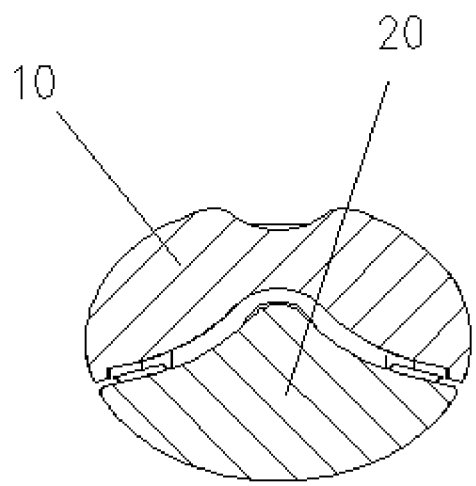
FIG. 4 is a sectional view along A-A in FIG. 3.
Figure 5:
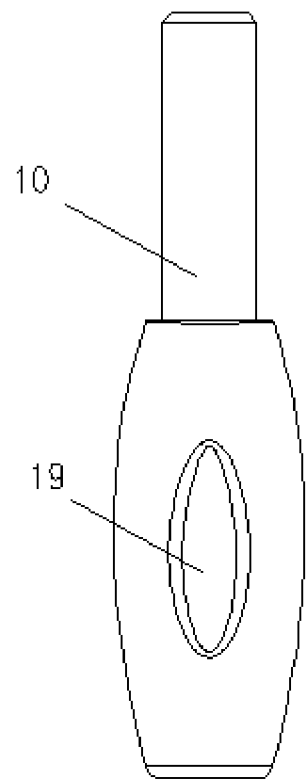
FIG. 5 is a rear view of an applicator according to Embodiment 1 of the present disclosure.
Figure 6:
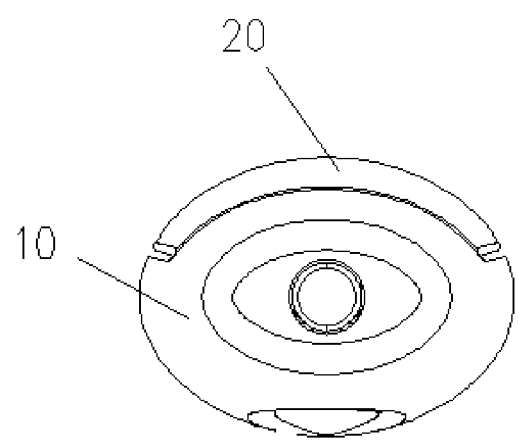
FIG. 6 is a bottom view of an applicator according to Embodiment 1 of the present disclosure.
Figure 7:
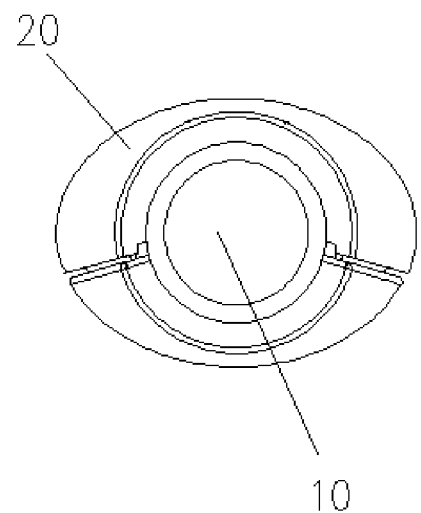
FIG. 7 is a top view of an applicator according to Embodiment 1 of the present disclosure.
Figure 8:
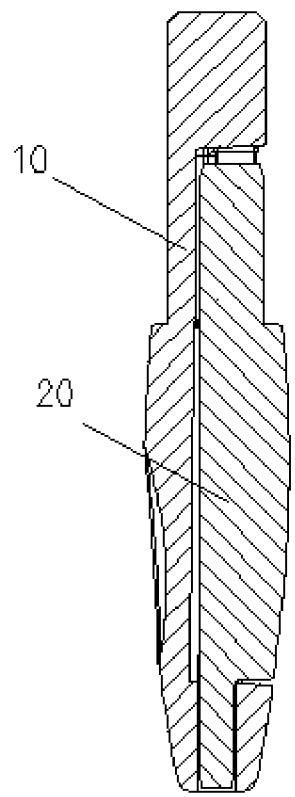
FIG. 8 is a sectional view of an applicator according to Embodiment 1 of the present disclosure.
Figure 9:
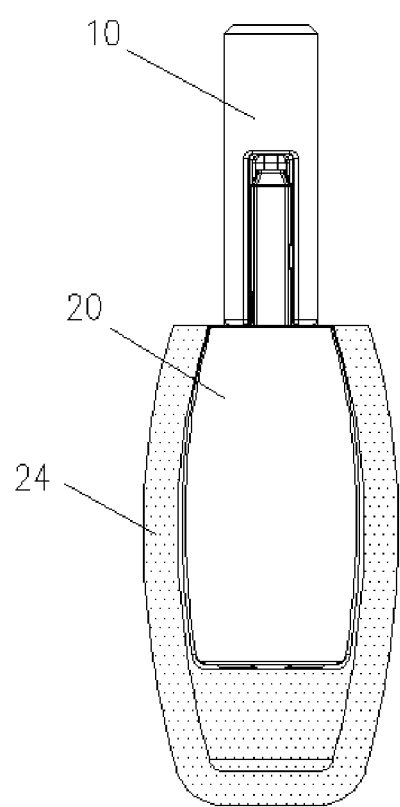
FIG. 9 is a front view of a flocked applicator according to Embodiment 1 of the present disclosure.
Figure 10:
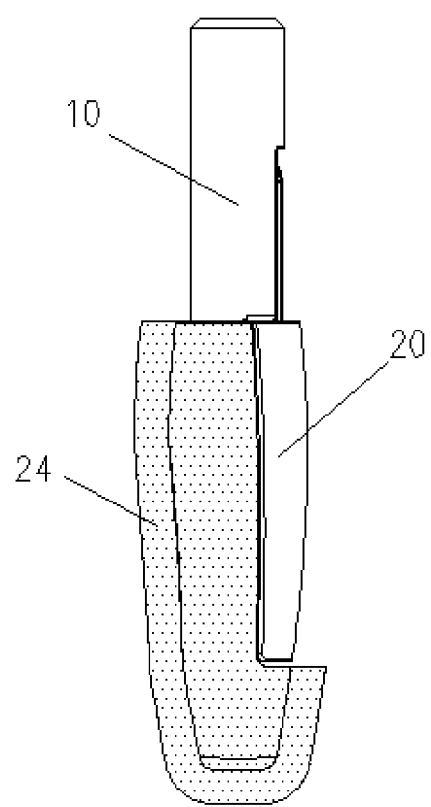
FIG. 10 is a left view of a flocked applicator according to Embodiment 1 of the present disclosure.
Figure 11:
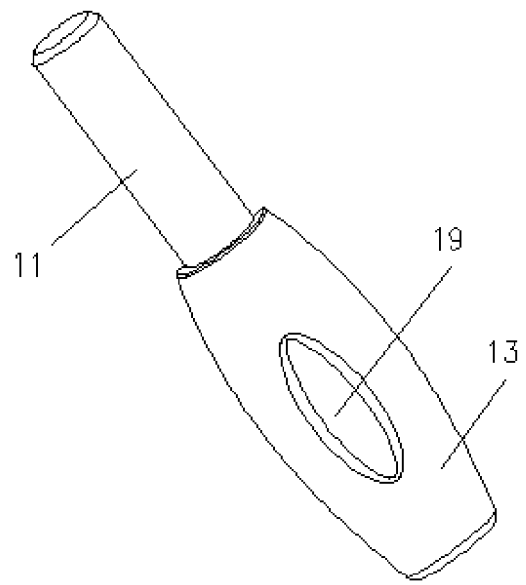
FIG. 11 is a first schematic structural view of an application assembly according to Embodiment 1 of the present disclosure.

In the figures: 10—application assembly, 11—connecting rod, 12—application head, 13—first surface, 14—second surface, 15—first mounting groove, 16—second mounting groove, 17—accommodating cavity, 18—clamping point portion, 19—storage groove, 20—insert, 21—first connecting member, 22—second connecting member, 23—convex rib, and 24—application unit.

DETAILED DESCRIPTION OF THE EMBODIMENTS

The technical solutions in the embodiments of the present disclosure are clearly and completely described below with reference to the embodiments of the present disclosure. Apparently, the described embodiments are merely some rather than all of the embodiments of the present disclosure. All other embodiments obtained by those of ordinary skill in the art based on the embodiments of the present disclosure without creative efforts should fall within the protection scope of the present disclosure.

It should be noted that the terms "first", "second", and so on in the description and claims of the present disclosure and in the above accompanying drawings are intended to distinguish similar objects but do not necessarily indicate a specific order or sequence. It should be understood that the objects used in such a way may be exchanged under proper conditions to make it possible to implement the described implementations of the present disclosure in sequences except those illustrated or described herein. Moreover, the terms "include", "have" and their variants mean to cover a non-exclusive inclusion. For example, a process, method, system, product or device that includes a list of steps or units is not necessarily limited to those steps or units which are clearly listed. Instead, they may include other steps or units which are not expressly listed or inherent to such a process, method, product, or device.

For ease of description, spatially relative terms, such as "above", "on the upper side of", "on the upper surface of" and "on", can be used to describe the spatial positional relationship between components or features shown in the figure. It should be understood that the spatially relative terms are intended to encompass different orientations of the components in use or operation in addition to those shown in the figure. For example, if a component in the figure is inverted, it is described as a component "above other component or structure" or "on other component or structure". Therefore, the component will be positioned as "below other component or structure" or "under other component or structure". Therefore, the exemplary term "above" may include both orientations "above" and "below". The component may also be positioned in other different ways (rotated by 90 degrees or in other orientations), but the relative description of the space should be explained accordingly.

Embodiment 1: As shown in FIGS. 1-29, a split applicator includes application assembly 10 and insert 20. The application assembly 10 includes connecting rod 11 and application head 12 that are connected fixedly. A mounting groove and accommodating cavity 17 communicating with each other are formed in the application head 12. A connecting member is fixed on the insert 20. The insert 20 is provided in the accommodating cavity 17. The connecting member is inserted into the mounting groove to assemble the insert 20 and the application assembly 10 together. The connecting rod 11 in the application assembly 10 is configured to mount the applicator in a brush rod. Application unit 24 is provided on the application head 12 for makeup application. The application unit may be bristles, cotton or pile. The cotton or the pile may be formed on a surface of the application head 12 by means of independent flocking. The bristles may be integrated with or split from the application head. The applicator includes the application assembly 10 and the insert 20 that are independent from each other. In response to mounting, the insert 20 is provided in the accommodating cavity 17 of the application head 12, and the connecting member on the insert 20 is inserted into the mounting groove of the application assembly 10. Thus, the application assembly and the insert are connected firmly and mounted conveniently. A hardness of the insert 20 can be greater than a hardness of the application assembly 10. When the application head is used for the makeup application, the insert supports the application head, such that the application head is not bent to achieve a desirable makeup effect. Application units of different materials, sizes, and densities may be respectively provided on the insert and the application head. This satisfies different makeup requirements of users, and expands the use function of the applicator.

The mounting groove includes a first mounting groove, or the mounting groove includes a second mounting groove, or the mounting groove includes a first mounting groove and a second mounting groove.

In a case where the mounting groove includes the first mounting groove, the first mounting groove is formed in the connecting rod. A first end of the insert is provided with a first connecting member. The first connecting member is inserted into the first mounting groove.

In a case where the mounting groove includes the second mounting groove, the second mounting groove is formed in the application head. A second end of the insert is provided with a second connecting member. The second connecting member is inserted into the second mounting groove.

Optionally, as shown in FIGS. 11-21, the application head 12 includes first surface 13 and second surface 14 that are arranged opposite to each other. The accommodating cavity 17 is formed in the second surface 14. The mounting groove includes the first mounting groove 15 and the second mounting groove 16. The first mounting groove 15 is formed in the connecting rod 11, while the second mounting groove 16 is formed in the application head 12. As shown in FIGS. 19-22, two ends of the insert 20 are respectively provided with first connecting member 21 and second connecting member 22. The first connecting member 21 is inserted into the first mounting groove 15. The second connecting member 22 is inserted into the second mounting groove 16. The insert 20 is embedded into the accommodating cavity 17. The two ends of the insert 20 are fixedly connected to the first mounting groove 15 and the second mounting groove 16 through the connecting members. Therefore, the insert can be firmly mounted in the application assembly without falling.

Figure 12:
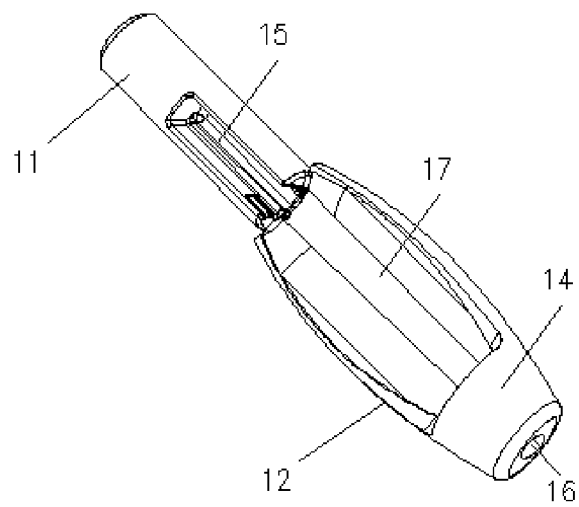
FIG. 12 is a second schematic structural view of an application assembly according to Embodiment 1 of the present disclosure.
Figure 13:
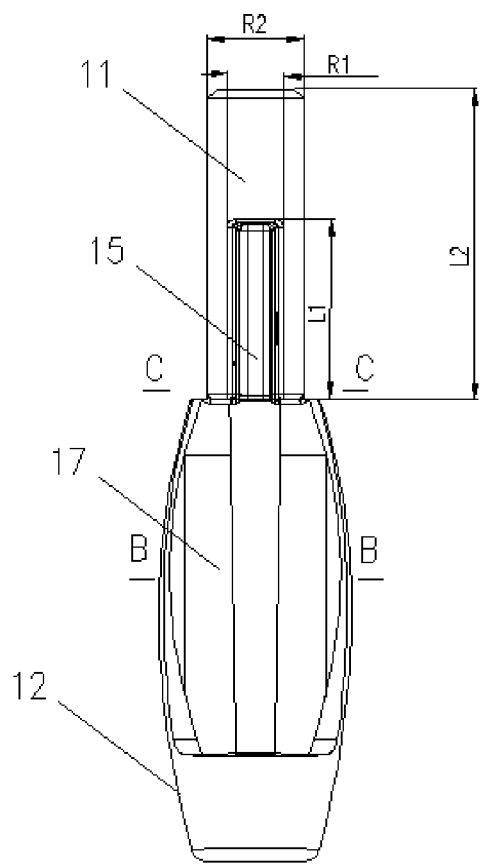
FIG. 13 is a front view of an application assembly according to Embodiment 1 of the present disclosure.
Figure 14:
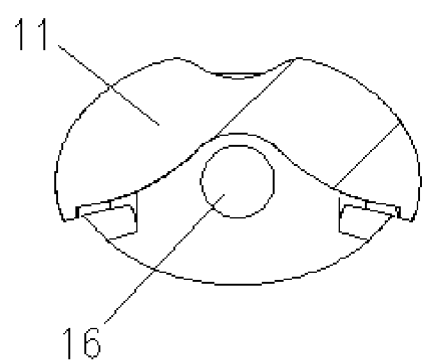
FIG. 14 is a sectional view along B-B in FIG. 13.
Figure 15:
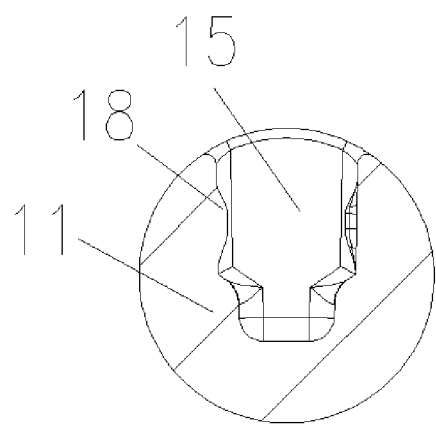
FIG. 15 is a sectional view along C-C in FIG. 13.
Figure 16:
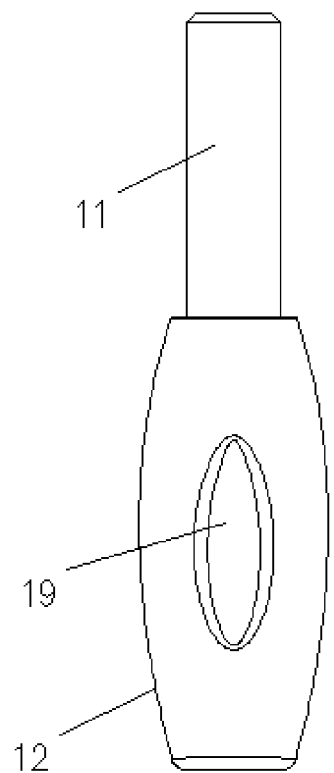
FIG. 16 is a rear view of an application assembly according to Embodiment 1 of the present disclosure.
Figure 17:
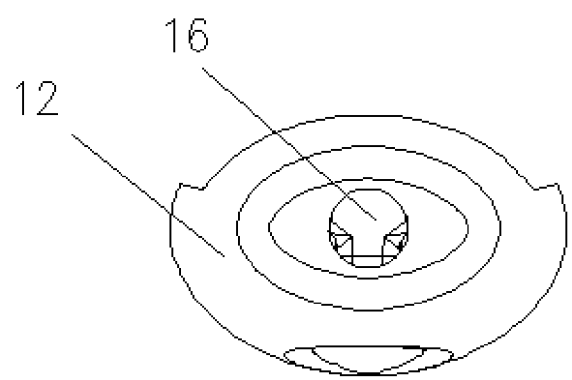
FIG. 17 is a bottom view of an application assembly according to Embodiment 1 of the present disclosure.
Figure 18:
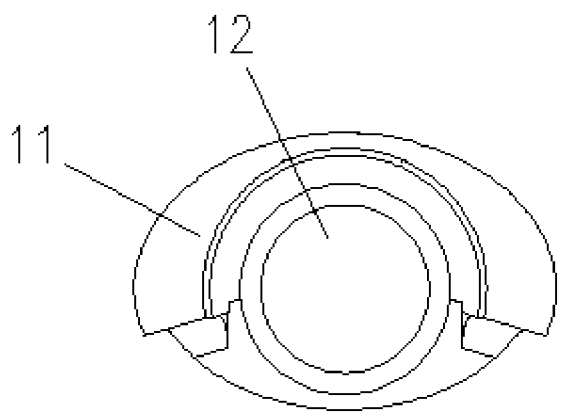
FIG. 18 is a top view of an application assembly according to Embodiment 1 of the present disclosure.
Figure 19:
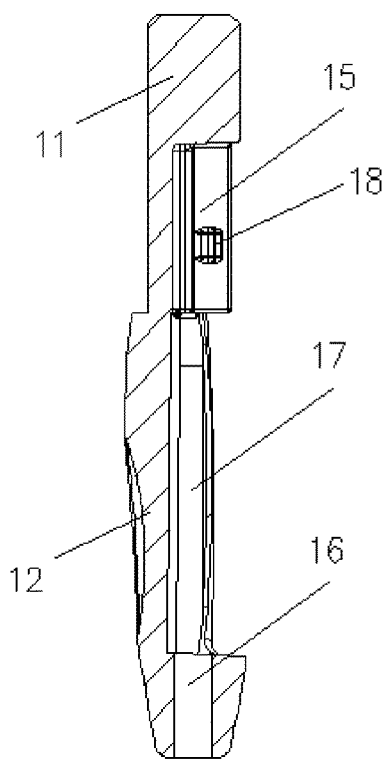
FIG. 19 is a sectional view of an application assembly according to Embodiment 1 of the present disclosure.
Figure 23:
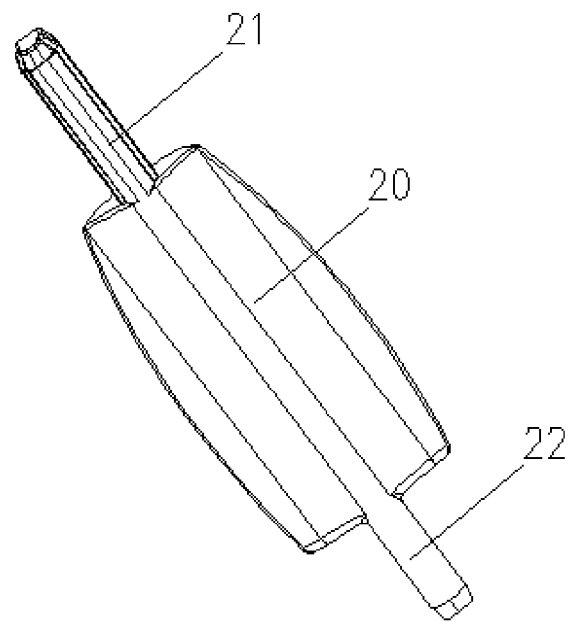
FIG. 23 is a second schematic structural view of an insert according to Embodiment 1 of the present disclosure.
Figure 24:
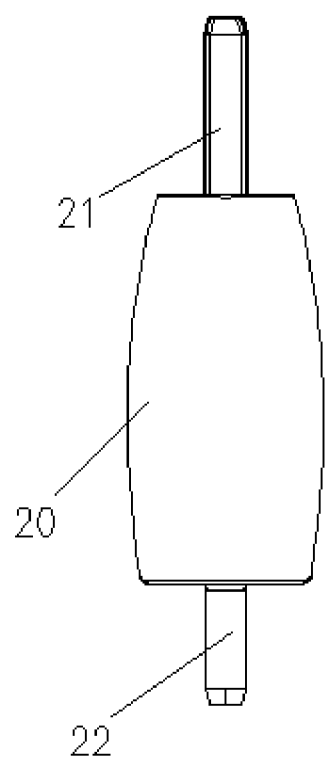
FIG. 24 is a front view of an insert according to Embodiment 1 of the present disclosure.
Figure 25:
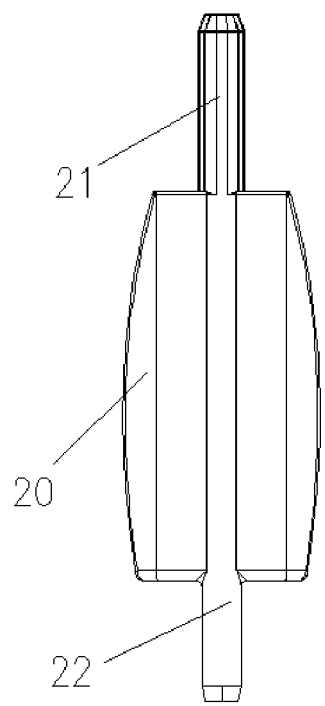
FIG. 25 is a rear view of an insert according to Embodiment 1 of the present disclosure.
Figure 26:
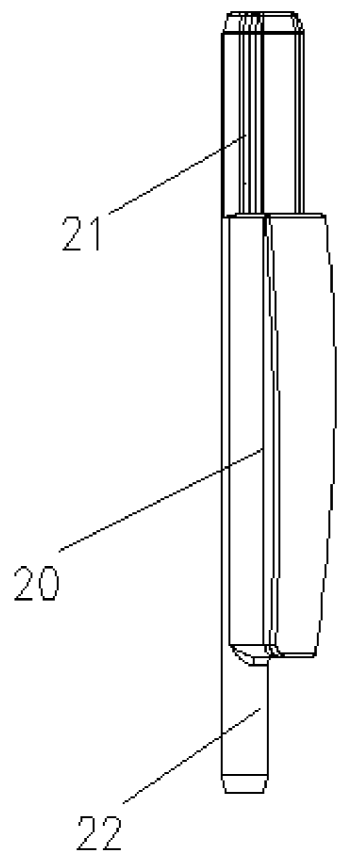
FIG. 26 is a left view of an insert according to Embodiment 1 of the present disclosure.
Figure 27:
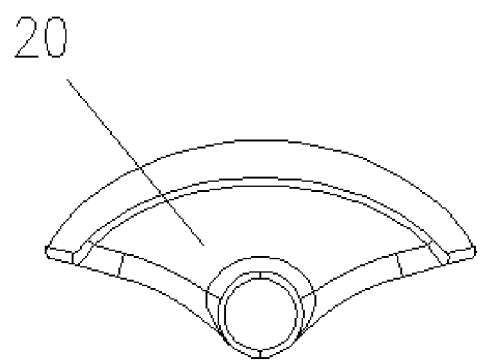
FIG. 27 is a bottom view of an insert according to Embodiment 1 of the present disclosure.
Figure 28:
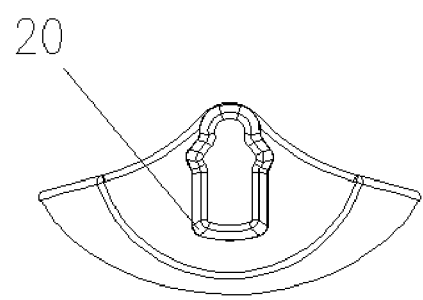
FIG. 28 is a top view of an insert according to Embodiment 1 of the present disclosure.
Figure 29:
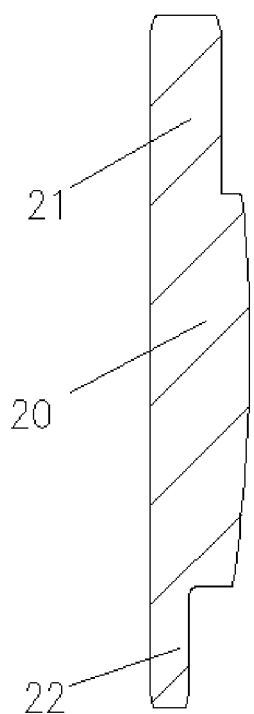
FIG. 29 is a sectional view of an insert according to Embodiment 1 of the present disclosure.
Figure 30:
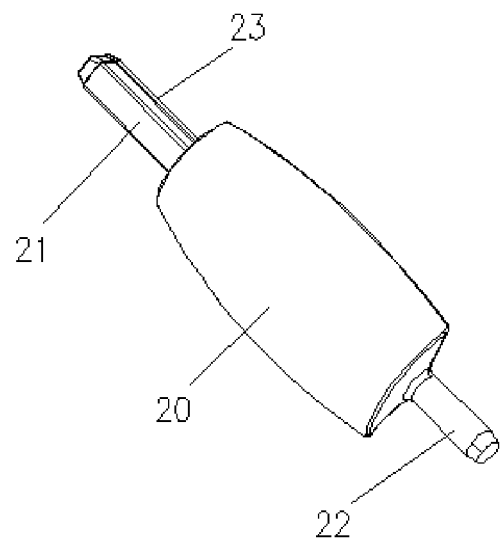
FIG. 30 is a first schematic structural view of an insert according to Embodiment 2 of the present disclosure.
Figure 31:
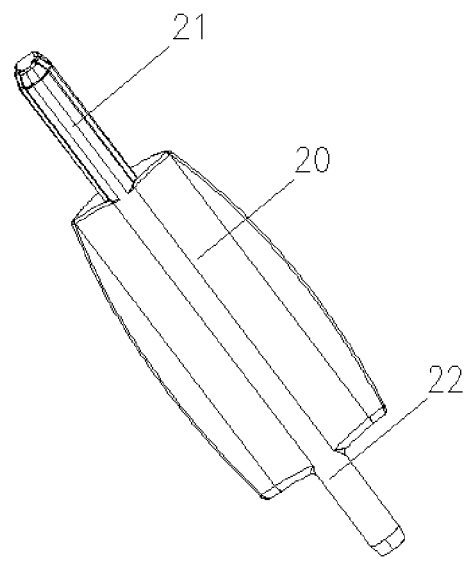
FIG. 31 is a second schematic structural view of an insert according to Embodiment 2 of the present disclosure.
Figure 32:
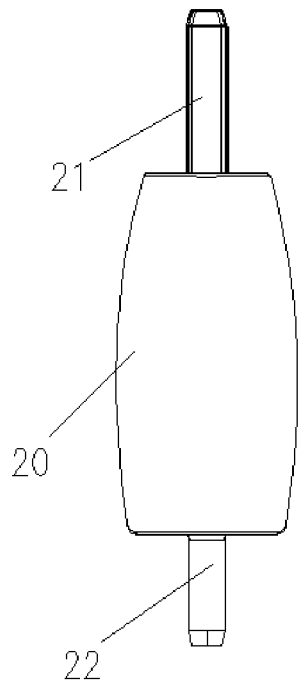
FIG. 32 is a front view of an insert according to Embodiment 2 of the present disclosure.
Figure 33:
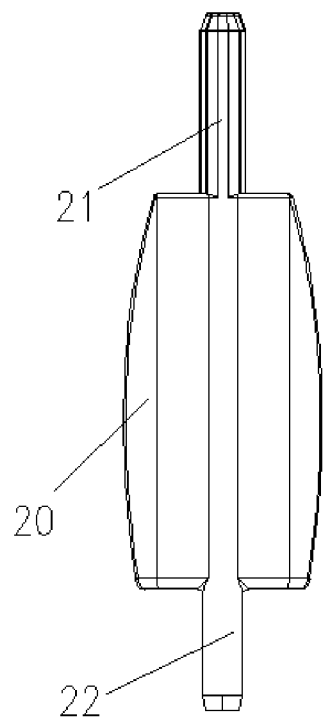
FIG. 33 is a rear view of an insert according to Embodiment 2 of the present disclosure.
Figure 34:
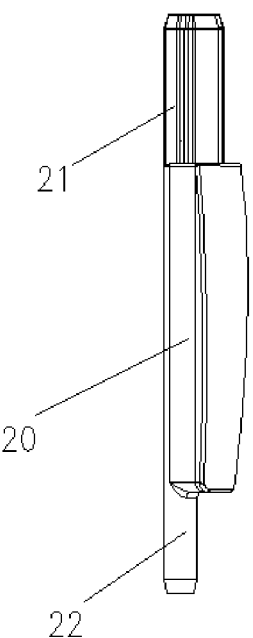
FIG. 34 is a left view of an insert according to Embodiment 2 of the present disclosure.
Figure 35:
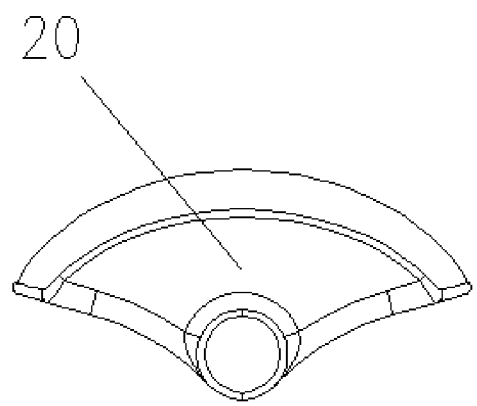
FIG. 35 is a bottom view of an insert according to Embodiment 2 of the present disclosure.
Figure 36:
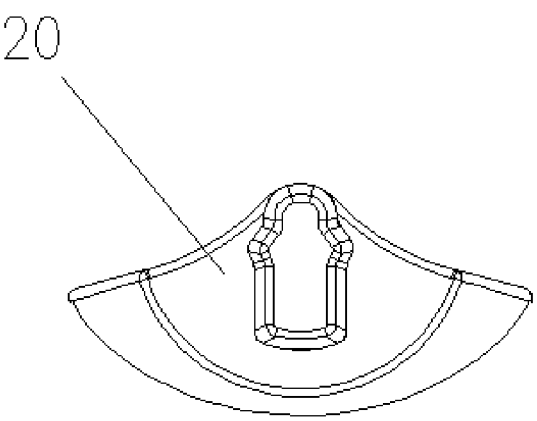
FIG. 36 is a top view of an insert according to Embodiment 2 of the present disclosure.
Figure 37:
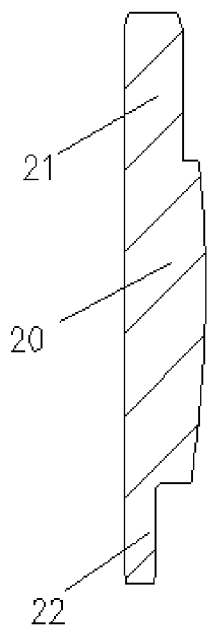
FIG. 37 is a sectional view of an insert according to Embodiment 2 of the present disclosure.
Figure 38:
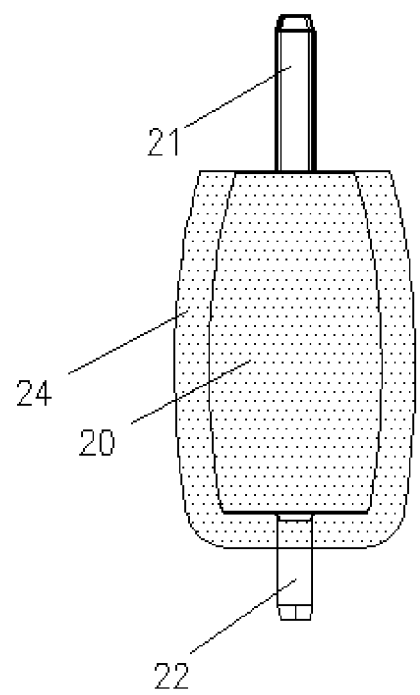
FIG. 38 is a second schematic structural view of a flocked insert according to Embodiment 2 of the present disclosure.
Figure 39:
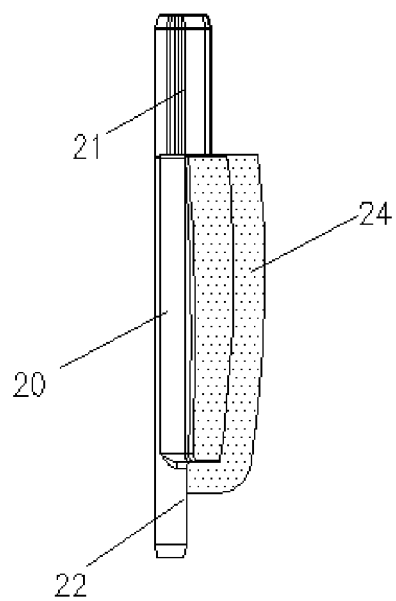
FIG. 39 is a left view of a flocked insert according to Embodiment 2 of the present disclosure.
Figure 40:
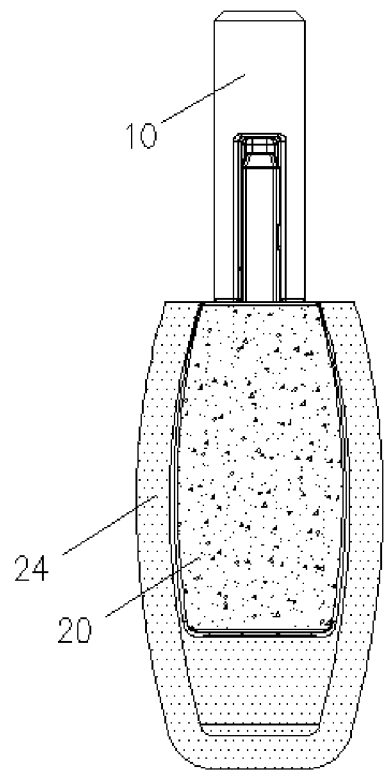
FIG. 40 is a schematic structural view of a flocked applicator according to Embodiment 2 of the present disclosure.
Figure 41:
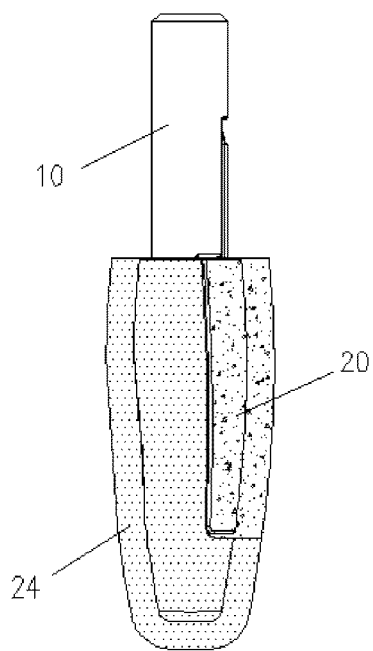
FIG. 41 is a left view of a flocked applicator according to Embodiment 2 of the present disclosure.

A first end of the application head 12 is connected to the connecting rod 11, and a second end of the application head 12 is a free end. Two ends of the accommodating cavity 17 are respectively communicated with the first mounting groove 15 and the second mounting groove 16. The second mounting groove 16 is a through groove. The second mounting groove 16 penetrates through the second end of the application head 12. By designing the second mounting groove 16 as the through groove, a needle-like slider in a die is drawn out smoothly in demolding. This optimizes a demolding process, and simplifies a structure of the die. The application head 12 is downsized gradually from the first end to the second end. Or the application head is large in the middle and small at the two ends, with the first end greater than the second end. As shown in FIGS. 12-13, the top-opened accommodating cavity 17 is formed directly in the second surface 14 of the application head 12. A surface area of the accommodating cavity 17 accounts for at least a half of an area of the second surface 14. The remaining second surface 14 is provided thereon with the application unit for the makeup application. Optionally, the application head 12 is clamped with a lower surface of the insert 20 through a convex edge assembly. As shown in FIG. 23, a plurality of convex edges are arranged axially on the lower surface of the insert 20. As shown in FIG. 12, grooves matching with the convex edges are formed in a bottom of the accommodating cavity 17. In response to assembly, the convex edges are firmly clamped into the grooves. This can further increase a binding force between the application head and the insert.

As shown in FIG. 13, the first mounting groove 15 is arranged along an axial direction of the connecting rod 11. The first mounting groove 15 has a length of L1, and the connecting rod 11 has a length of L2, where L1≤0.5*L2. The first mounting groove 15 has a diameter of R1, and the connecting rod 11 has a diameter of R2, where R1≤0.5*R2. By limiting the sizes of the first mounting groove 15 within the above ranges, after the connecting rod 11 is mounted on the brush rod, the connecting rod and the brush rod are fixed conveniently by dotting. The first mounting groove 15 is a top-opened mounting groove. A gap is formed between the first mounting groove 15 and the first connecting member 21. As shown in FIG. 1, the gap is formed between the first mounting groove 15 and the first connecting member 21, so as to mount the insert conveniently.

Figure 42:
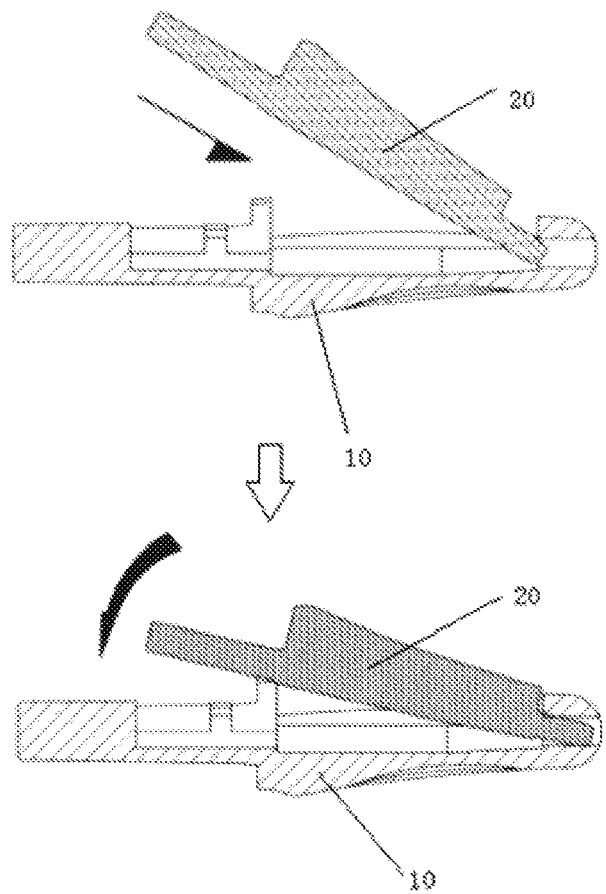
FIG. 42 is a first assembly view of an applicator according to Embodiment 2 of the present disclosure.
Figure 43:
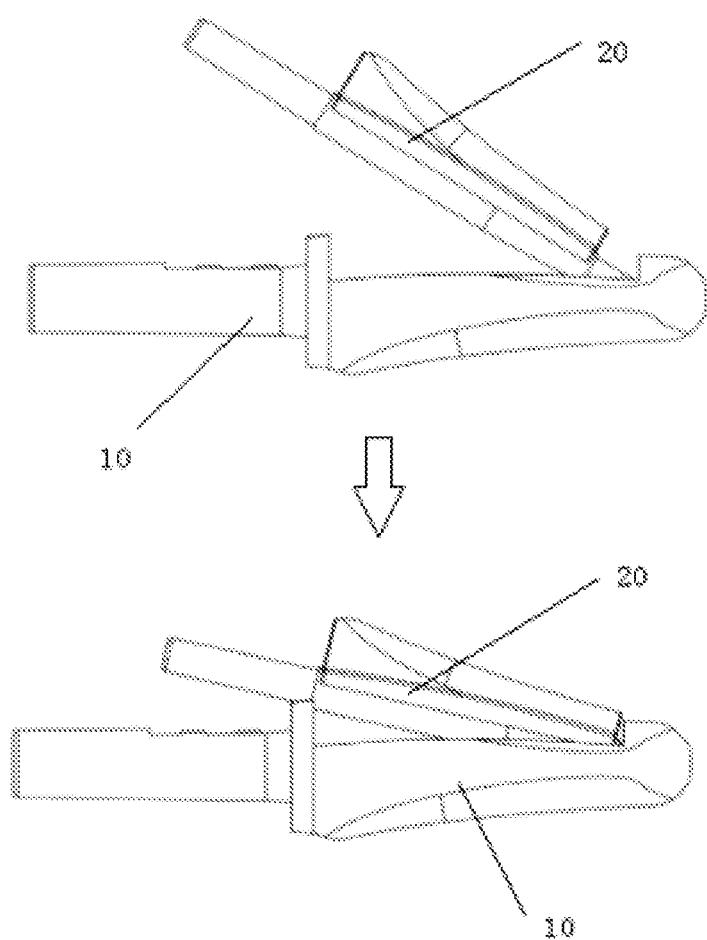
FIG. 43 is a second assembly view of an applicator according to Embodiment 2 of the present disclosure.

The first connecting member 21 and the connecting rod 11 are fixed through a clamping structure. In response to assembly, as shown in FIGS. 42-43, the second connecting member 22 of the insert 20 is inserted into the second mounting groove 16 along an arrow in a first drawing in FIG. 42. Thereafter, along an arrow in a second drawing in FIG. 42, the insert 20 is pressed down, such that the first connecting member 21 is clamped into the first mounting groove 15, and the convex edges on the inner surface of the insert 20 are clamped with the grooves in the accommodating cavity 17, or both the insert and the accommodating cavity are clamped with each other through the convex edges and the grooves. In the embodiment, through the first connecting member 21 and the clamping structure in the first mounting groove 15, the insert is fixedly connected to the connecting rod. Therefore, the insert and the application assembly are connected very firmly.

Figure 22:
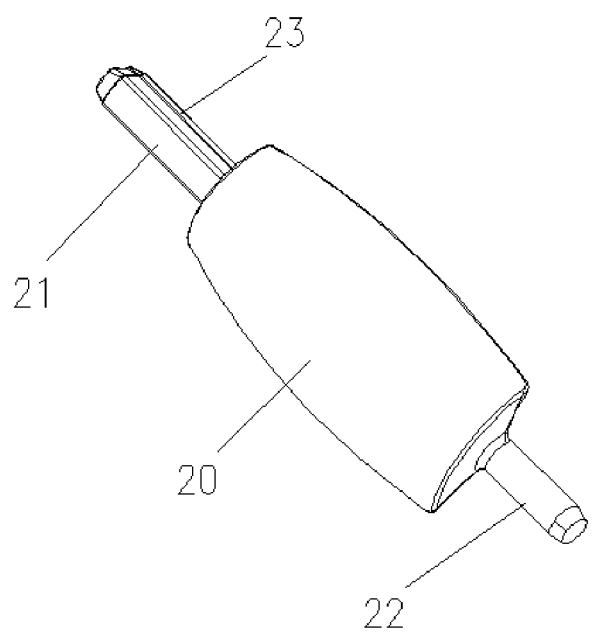
FIG. 22 is a first schematic structural view of an insert according to Embodiment 1 of the present disclosure.

In an implementation, the clamping structure includes clamping point portion 18 and convex rib 23. As shown in FIG. 12, the clamping point portion 18 is provided in the first mounting groove 15. As shown in FIG. 22, the convex rib 23 is provided on the first connecting member 21. In response to assembly, the convex rib 23 slides through the clamping point portion 18 and is limited by the clamping point portion, namely both the convex rib and the clamping point portion are clamped with each other, thereby preventing the first connecting member 21 from falling from the first mounting groove 15. The reverse is also true, namely the convex rib 23 is provided in the first mounting groove 15, the clamping point portion 18 is provided on the first connecting member 21, and the convex rib 23 and the clamping point portion 18 are clamped with each other.

In another implementation, the clamping structure includes clamping point portion 18 and a clamping groove. The clamping point portion 18 is clamped into the clamping groove. The clamping point portion 18 is provided in the first mounting groove 15, and the clamping groove is formed in the first connecting member 21. Or, the clamping groove is formed in the first mounting groove 15, and the clamping point portion 18 is provided on the first connecting member 21. The connecting rod and the first connecting member can also be clamped firmly in cooperation with the clamping point portion and the clamping groove.

Figure 20:
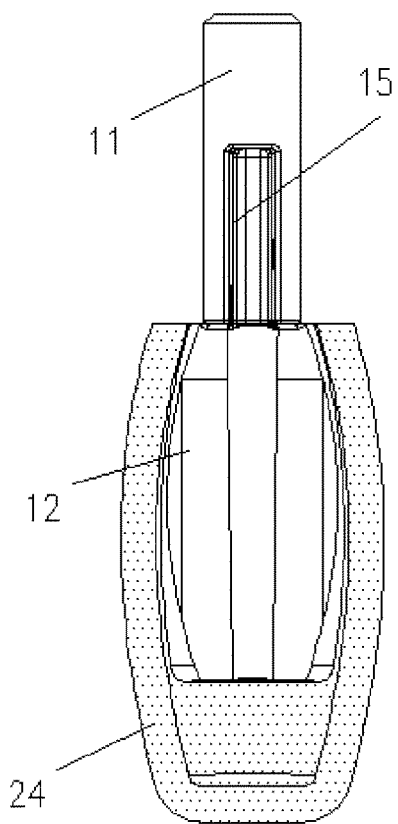
FIG. 20 is a front view of a flocked application assembly according to Embodiment 1 of the present disclosure.
Figure 21:
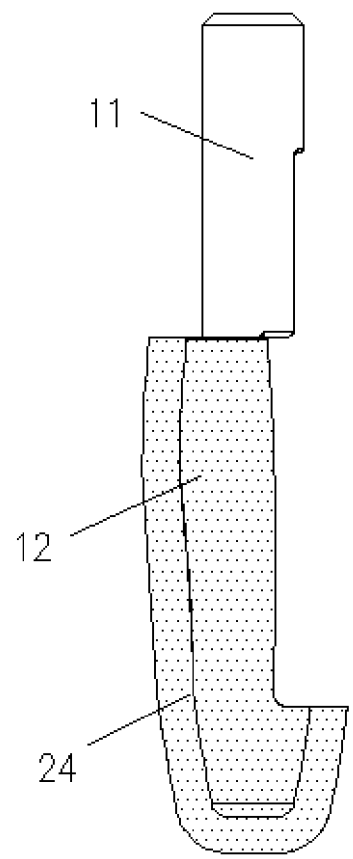
FIG. 21 is a left view of a flocked application assembly according to Embodiment 1 of the present disclosure.

The application assembly 10 is made of a plastic material. Storage groove 19 is formed in the first surface 13. Application unit 24 is provided on each of the first surface 13 and the second surface 14. As shown in FIGS. 20-21, the application unit 24 covers the first surface 13. The storage groove 19 is configured to store a material. The application unit 24 is provided on the second surface 14. An area of the application unit on the first surface 13 is greater than an area of the application unit on the second surface 14. In this way, the first surface is used for quick makeup application, while the second surface is used for fine makeup application. The application unit 24 may be formed by glue flocking, or the application unit 24 is integrally formed with the application assembly.

The insert 20 is made of a metal, ceramic or glass material. An outer surface of the insert 20 is a convex surface or a concave surface. The metal material is steel, iron, aluminum, copper, zinc, an aluminum alloy, a copper alloy, and other alloy materials. The outer surface of the insert 20 is a smooth surface. In the embodiment, the application assembly 10 is made of the plastic material, while the insert 20 is made of the metal, ceramic or glass material. The insert has a greater hardness than the application assembly. When the application head is used for the makeup application, the insert supports the application head, such that the application head is not bent to achieve the desirable makeup effect. Since the insert is made of the metal, ceramic or glass material, the applicator comes with a higher sense of luxury, and can provide multiple senses of touch for the users. Because of the smooth outer surface of the insert, a logo, a text, a pattern and so on can be provided on the smooth surface. In this way, the logo and the pattern are not covered for the glue flocking and are clear. For the smooth outer surface of the insert, the material carried by the application head each time can further be reduced, thereby preventing a waste of the material.

Embodiment 2: As shown in FIGS. 30-41, the embodiment differs from Embodiment 1 for the material of the insert. In the embodiment, the insert 20 is made of a plastic material, and an outer surface of the insert 20 is provided with the application unit 24. Optionally, the insert 20 is made of a thermoplastic polyester elastomer material, namely both the application assembly 10 and the insert 20 are made of the plastic material. The application assembly and the insert may be made of a same material, and may also be made of different materials. Optionally, the insert 20 has a greater hardness than the application assembly 10. The outer surface of the insert 20 is also provided with the application unit 24. The application unit on the application head 12 and the application unit on the insert may be the same, and may also be different in hardness, size and density. Optionally, application units of different materials, sizes and densities may be respectively provided on the insert and the application head to meet different makeup requirements of the users.

It should be noted that those of ordinary skill in the art can further make variations and improvements without departing from the conception of the present disclosure. These variations and improvements all fall within the protection scope of the present disclosure. Therefore, the protection scope of the present disclosure should be subject to the protection scope defined by the claims.

What is claimed is:

1. A split applicator, comprising an application assembly and an insert, wherein the application assembly comprises a connecting rod and an application head, wherein the connecting rod and the application head are connected fixedly, a mounting groove and an accommodating cavity communicating with each other are formed in the application head, a connecting member is fixed on the insert, the insert is provided in the accommodating cavity, and the connecting member is inserted into the mounting groove to assemble the insert and the application assembly together;

wherein the application head comprises a first surface and a second surface, wherein the first surface and the second surface are arranged opposite to each other, the accommodating cavity is formed in the second surface, and the mounting groove comprises a first mounting groove and/or a second mounting groove;

when the mounting groove comprises the first mounting groove, the first mounting groove is formed in the connecting rod, a first end of the insert is provided with the connecting member, and the connecting member is inserted into the first mounting groove; and when the mounting groove comprises the second mounting groove, the second mounting groove is formed in the application head, a second end of the insert is provided with a second connecting member, and the second connecting member is inserted into the second mounting groove;

wherein when the mounting groove comprises the second mounting groove, the second mounting groove is a through groove;

wherein when the mounting groove comprises the first mounting groove and the second mounting groove, a first end of the application head is connected to the connecting rod, and a second end of the application head is a free end; two ends of the accommodating cavity are respectively communicated with the first mounting groove and the second mounting groove; and the application head is clamped with a lower surface of the insert through a convex edge assembly.

2. The split applicator according to claim 1, wherein the second mounting groove penetrates through the second end of the application head.

3. The split applicator according to claim 2, wherein the insert is made of a metal, ceramic or glass material, and an outer surface of the insert is a convex surface or a concave surface.

4. The split applicator according to claim 2, wherein the first mounting groove is arranged along an axial direction of the connecting rod; the first mounting groove has a length of L1, and the connecting rod has a length of L2, wherein L1≤0.5*L2; the first mounting groove has a diameter of R1, and the connecting rod has a diameter of R2, wherein R1≤0.5*R2; the first mounting groove is a top-opened mounting groove; and a gap is formed between the first mounting groove and the first connecting member.

5. The split applicator according to claim 4, wherein the insert is made of a metal, ceramic or glass material, and an outer surface of the insert is a convex surface or a concave surface.

6. The split applicator according to claim 2, wherein the first connecting member and the connecting rod are fixed through a clamping structure.

7. The split applicator according to claim 6, wherein the insert is made of a metal, ceramic or glass material, and an outer surface of the insert is a convex surface or a concave surface.

8. The split applicator according to claim 6, wherein the clamping structure comprises a clamping point portion and a convex rib; the clamping point portion is provided in the first mounting groove, and the convex rib is provided on the first connecting member; or the convex rib is provided in the first mounting groove, and the clamping point portion is provided on the first connecting member; and the convex rib and the clamping point portion are clamped with each other.

9. The split applicator according to claim 8, wherein the insert is made of a metal, ceramic or glass material, and an outer surface of the insert is a convex surface or a concave surface.

10. The split applicator according to claim 6, wherein the clamping structure comprises a clamping point portion and a clamping groove, and the clamping point portion is clamped into the clamping groove;
the clamping point portion is provided in the first mounting groove, and the clamping groove is formed in the first connecting member; or,
the clamping groove is formed in the first mounting groove, and the clamping point portion is provided on the first connecting member.

11. The split applicator according to claim 10, wherein the insert is made of a metal, ceramic or glass material, and an outer surface of the insert is a convex surface or a concave surface.

12. The split applicator according to claim 1, wherein the application assembly is made of a plastic material, a storage groove is formed in the first surface, and an application unit is provided on each of the first surface and the second surface.

13. The split applicator according to claim 12, wherein the insert is made of a metal, ceramic or glass material, and an outer surface of the insert is a convex surface or a concave surface.

14. The split applicator according to claim 1, wherein the insert is made of a metal, ceramic or glass material, and an outer surface of the insert is a convex surface or a concave surface.

15. The split applicator according to claim 1, wherein the insert is made of a plastic material, and an outer surface of the insert is provided with an application unit.

\* \* \* \* \*